United States Patent
Takahashi et al.

(10) Patent No.: US 12,232,175 B2
(45) Date of Patent: Feb. 18, 2025

(54) USER APPARATUS AND BASE STATION APPARATUS

(71) Applicant: NTT DOCOMO, INC., Tokyo (JP)

(72) Inventors: Hideaki Takahashi, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 371 days.

(21) Appl. No.: 17/435,255

(22) PCT Filed: Mar. 6, 2019

(86) PCT No.: PCT/JP2019/008967
§ 371 (c)(1),
(2) Date: Aug. 31, 2021

(87) PCT Pub. No.: WO2020/179037
PCT Pub. Date: Sep. 10, 2020

(65) Prior Publication Data
US 2022/0132585 A1    Apr. 28, 2022

(51) Int. Cl.
*H04W 74/04*    (2009.01)
*H04W 72/21*    (2023.01)
(Continued)

(52) U.S. Cl.
CPC ....... *H04W 74/0833* (2013.01); *H04W 72/21* (2023.01); *H04W 74/004* (2013.01)

(58) Field of Classification Search
CPC ........... H04W 74/0833; H04W 74/006; H04W 72/23; H04W 76/11; H04W 80/02;
(Continued)

(56) References Cited

U.S. PATENT DOCUMENTS 10,945,209 B2 *  3/2021  Kim ................ H04L 1/0061
11,039,480 B2 *  6/2021  Jeon ............... H04W 16/14
(Continued)

FOREIGN PATENT DOCUMENTS

KR    20190017610 A    2/2019

OTHER PUBLICATIONS

International Search Report issued in PCT/JP2019/008967 on Apr. 23, 2019 (5 pages).
(Continued)

*Primary Examiner* — Joseph Arevalo
(74) *Attorney, Agent, or Firm* — Osha Bergman Watanabe & Burton LLP

(57) ABSTRACT

A user apparatus includes a transmission unit for transmitting a signal related to a random access procedure in a serving cell; a reception unit for receiving a signal related to the random access procedure in the serving cell; and a control unit for determining a carrier to be used for the random access procedure, the carrier being configured to the serving cell. The control unit determines whether a first carrier is configured to the serving cell, determines whether the first carrier of the serving cell is supported when the first carrier is configured to the serving cell, and determines to use the first carrier for the random access procedure when the first carrier of the serving cell is supported. An operation of determining the carrier to be used for the random access procedure is performed in at least one of a MAC layer and an RRC layer.

6 Claims, 12 Drawing Sheets

(51) Int. Cl.
*H04W 74/00* (2009.01)
*H04W 74/0833* (2024.01)

(58) Field of Classification Search
CPC ... H04W 74/004; H04W 76/27; H04W 76/28;
H04W 24/08; H04W 36/0069; H04W
52/367; H04W 52/50; H04W 56/001;
H04W 72/0453; H04W 72/21; H04W
74/02; H04W 74/0841; H04W 36/0061;
H04W 36/0085; H04W 52/146; H04W
56/0005; H04W 72/04; H04W 72/0446;
H04W 72/1263; H04W 72/1268; H04W
72/20; H04W 72/54; H04W 74/008;
H04W 16/28; H04W 24/10; H04W
28/0205; H04W 28/04; H04W 36/0058;
H04W 36/0072; H04W 36/0077; H04W
36/06; H04W 48/20; H04W 52/143;
H04W 52/241; H04W 52/245; H04W
52/325; H04W 52/34; H04W 52/365;
H04W 52/383; H04W 52/46; H04W
72/044; H04W 72/0473; H04W 72/1273;
H04W 72/232; H04W 72/53; H04W
72/56; H04W 74/04; H04W 74/08; H04W
74/0858; H04W 74/0866; H04W 76/15;
H04W 76/16; H04W 76/18; H04W 8/22;
H04W 8/24; H04W 88/04
USPC .............................. 370/329, 331, 328, 230
See application file for complete search history.

(56) References Cited

U.S. PATENT DOCUMENTS

| | | | |
|---|---|---|---|
| 11,690,102 B2* | 6/2023 | Jeon | H04W 56/0005 370/332 |
| 2018/0376510 A1* | 12/2018 | Sun | H04W 74/006 |
| 2019/0053080 A1 | 2/2019 | Ryu et al. | |
| 2019/0089579 A1* | 3/2019 | Sang | H04W 56/0035 |
| 2019/0254074 A1* | 8/2019 | Jeon | H04W 74/0833 |
| 2020/0008242 A1* | 1/2020 | Lee | H04W 74/004 |
| 2020/0169990 A1* | 5/2020 | Takeda | H04W 52/325 |
| 2020/0396760 A1* | 12/2020 | Yi | H04L 1/1864 |
| 2021/0160920 A1* | 5/2021 | Ohta | H04W 72/23 |
| 2022/0210697 A1* | 6/2022 | Andersson | H04L 5/0091 |
| 2022/0417804 A1* | 12/2022 | Freda | H04W 36/30 |

OTHER PUBLICATIONS

Written Opinion of the International Searching Authority issued in PCT/JP2019/008967 on Apr. 23, 2019 (4 pages).

3GPP TS 38.300 V15.4.0; "3rd Generation Partnership Project; Technical Specification Group Radio Access Network; NR; NR and NG-RAN Overall Description; Stage 2 (Release 15)"; Dec. 2018 (97 pages).

3GPP TS 38.321 V15.4.0; "3rd Generation Partnership Project; Technical Specification Group Radio Access Network; NR; Medium Access Control (MAC) protocol specification (Release 15)"; Dec. 2018 (77 pages).

Office Action in counterpart Japanese Patent Application No. 2021-503355 issued on Sep. 13, 2022 (6 pages).

Samsung (Rapporteur); "General corrections on TS 38.321"; 3GPP TSG-RAN WG2 Meeting #101, R2-1803854; Athens, Greece; Feb. 26-Mar. 2, 2018 (63 pages).

H. Huawei; "Corrections to on-demand SI request and acquisition procedure"; 3GPP TSG-RAN WG2 Meeting #103bis, R2-1815074; Chengdu, China; Oct. 8-12, 2018 (6 pages).

Office Action issued in counterpart Chinese Patent Application No. 201980093471.2 mailed on Jan. 17, 2024 (21 pages).

3GPP TS 38.331 V15.4.0; "3rd Generation Partnership Project; Technical Specification Group Radio Access Network; NR; Radio Resource Control (RRC) protocol specification (Release 15)"; Dec. 2018 (68 pages).

Office Action issued in Chinese Application No. 201980093471.2; Dated Aug. 10, 2023 (20 pages).

Office Action issued in Chinese Application No. 201980093471.2, mailed Jun. 26, 2024 (18 pages).

Office Action issued in Chinese Application No. 201980093471.2, mailed Oct. 18, 2024 (18 pages).

* cited by examiner

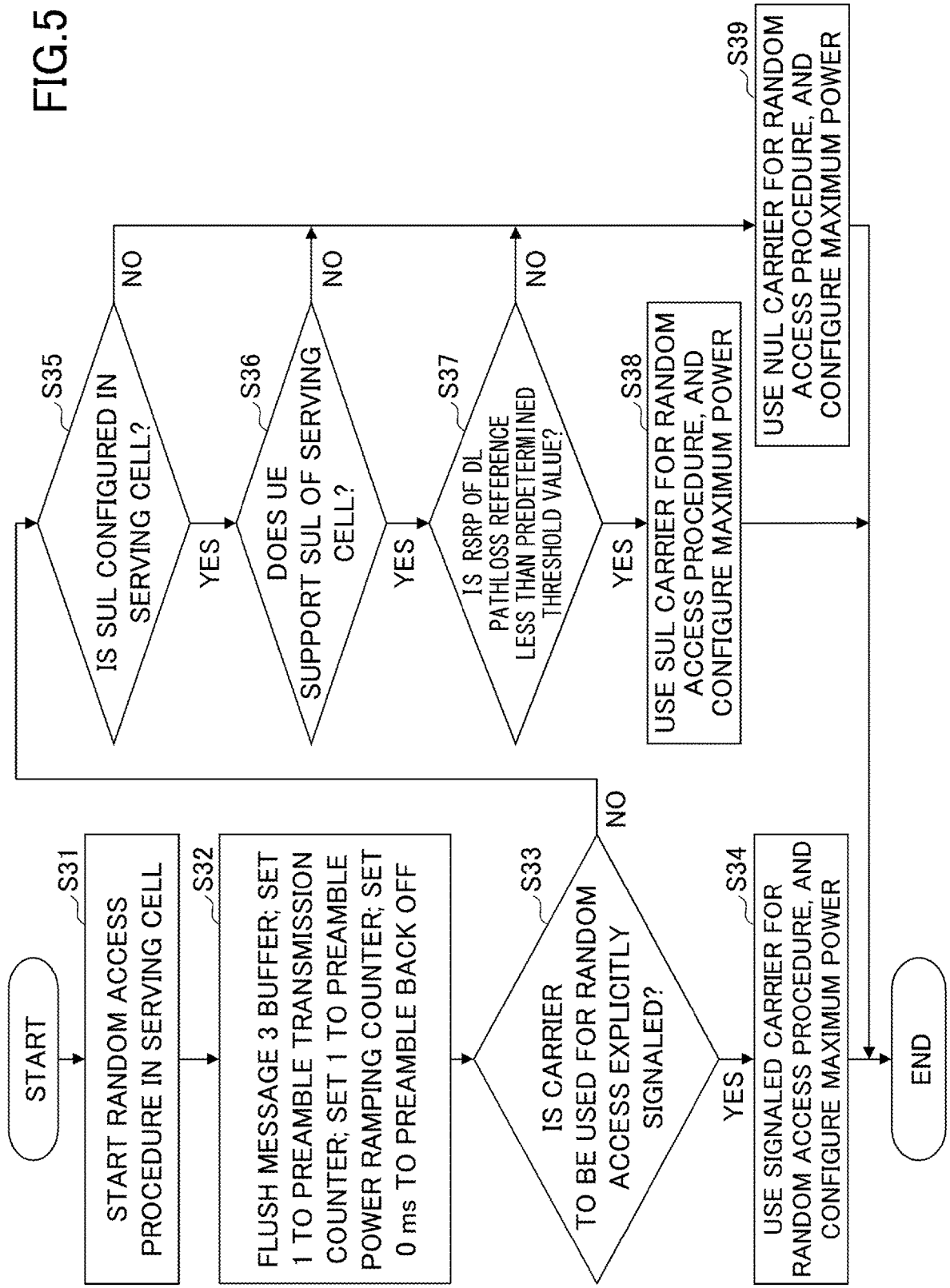

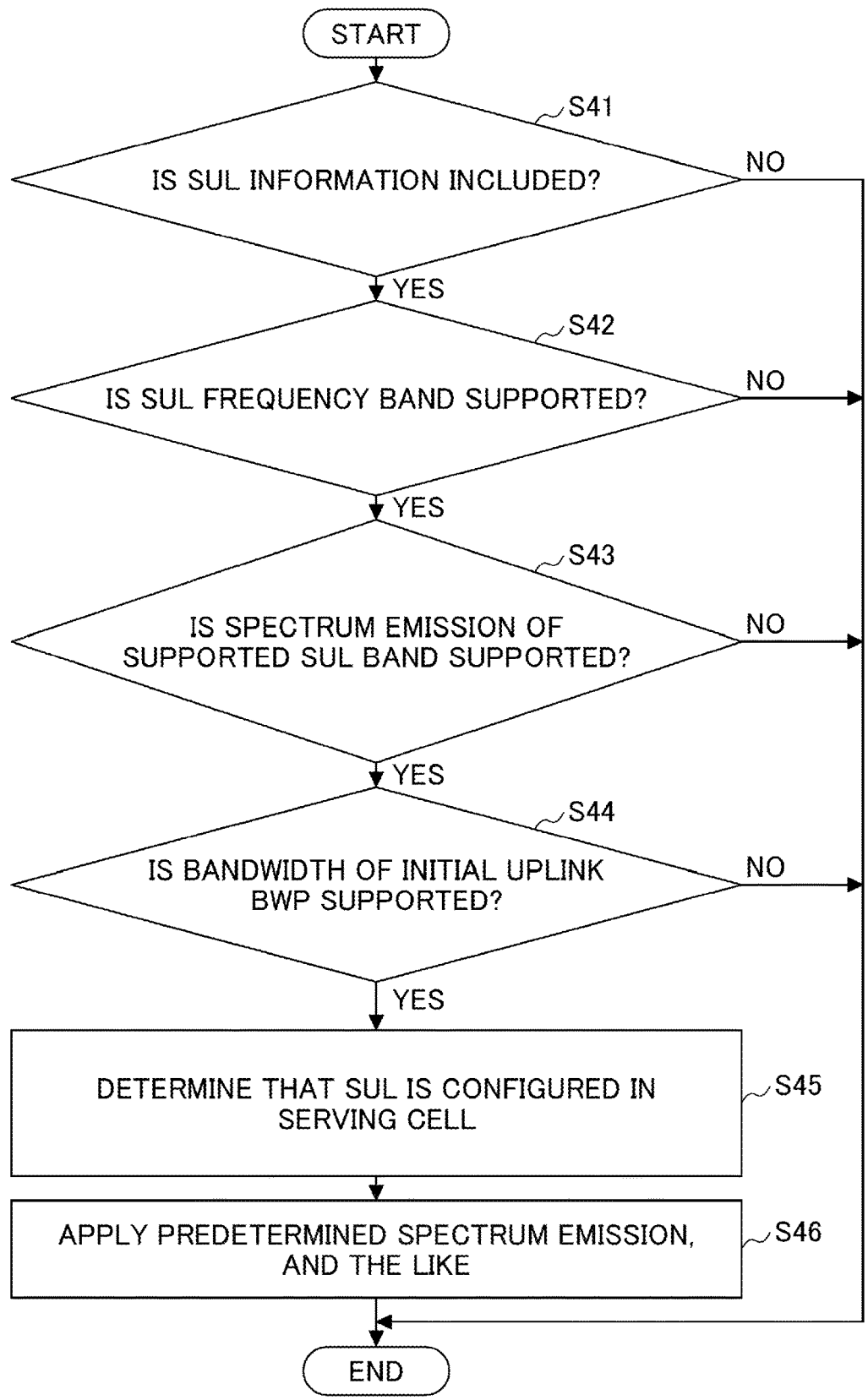

FIG.7A

When the Random Access procedure is initiated on a Serving Cell, the MAC entity shall:

1> flush the Msg3 buffer;

1> set the *PREAMBLE_TRANSMISSION_COUNTER* to 1;

1> set the *PREAMBLE_POWER_RAMPING_COUNTER* to 1;

1> set the *PREAMBLE_BACKOFF* to 0 ms;

1> if the carrier to use for the Random Access procedure is explicitly signalled:

2> select the signalled carrier for performing Random Access procedure;

2> set the *PCMAX* to $P_{CMAX,f,c}$ of the signalled carrier.

1> else if the carrier to use for the Random Access procedure is not explicitly signalled; and 1> if the Serving Cell for the Random Access procedure is configured with *supplementaryUplink*; and 1> <u>if the UE supports supplemental uplink for the serving cell; and (Alternative 1)</u>

1> <u>if the UE supports a band combination comprised of SUL band(s) applicable to the Serving Cell; and (Alternative 2)</u>

1> if the RSRP of the downlink pathloss reference is less than *rsrp-ThresholdSSB-SUL*:

2> select the SUL carrier for performing Random Access procedure;

2> set the *PCMAX* to $P_{CMAX,f,c}$ of the SUL carrier.

1> else:

2> select the NUL carrier for performing Random Access procedure;

2> set the *PCMAX* to $P_{CMAX,f,c}$ of the NUL carrier.

FIG.7B

```
1> perform the BWP operation as specified in subclause 5.15;
1> set PREAMBLE_POWER_RAMPING_STEP to powerRampingStep;
1> set SCALING_FACTOR_BI to 1;
1> if the Random Access procedure was initiated for beam failure recovery (as specified in subclause 5.17); and
1> if beamFailureRecoveryConfig is configured for the active UL BWP of the selected carrier:
    2> start the beamFailureRecoveryTimer, if configured;
    2> apply the parameters powerRampingStep, preambleReceivedTargetPower, and preambleTransMax
       configured in the beamFailureRecoveryConfig;
    2> if powerRampingStepHighPriority is configured in the beamFailureRecoveryConfig:
        3> set PREAMBLE_POWER_RAMPING_STEP to the powerRampingStepHighPriority.
    2> else:
        3> set PREAMBLE_POWER_RAMPING_STEP to powerRampingStep.
    2> if scalingFactorBI is configured in the beamFailureRecoveryConfig:
        3> set SCALING_FACTOR_BI to the scalingFactorBI.
1> else if the Random Access procedure was initiated for handover; and
1> if rach-ConfigDedicated is configured for the selected carrier:
    2> if powerRampingStepHighPriority is configured in the rach-ConfigDedicated:
        3> set PREAMBLE_POWER_RAMPING_STEP to the powerRampingStepHighPriority.
    2> if scalingFactorBI is configured in the rach-ConfigDedicated:
        3> set SCALING_FACTOR_BI to the scalingFactorBI.
1> perform the Random Access Resource selection procedure (see subclause 5.1.2).
```

FIG.8A 5.2.2.4.2  Actions upon reception of the *SIB1*

Upon receiving the *SIB1* the UE shall:

1> store the acquired *SIB1*;

1> if the *cellAccessRelatedInfo* contains an entry with the *PLMN-Identity* of the selected PLMN:

2> in the remainder of the procedures use *plmn-IdentityList*, *trackingAreaCode*, and *cellIdentity* for the cell as received in the corresponding *PLMN-IdentityInfo* containing the selected PLMN;

1> if in RRC_CONNECTED while T311 is not running:

2> disregard the *frequencyBandList*, if received, while in RRC_CONNECTED;

2> forward the *cellIdentity* to upper layers;

2> forward the *trackingAreaCode* to upper layers;

2> apply the configuration included in the *servingCellConfigCommonSIB*;

1> else:

2> if the UE supports one or more of the frequency bands indicated in the *frequencyBandList* for downlink, and one or more of the frequency bands indicated in the *frequencyBandList* for uplink for FDD~~or one or more of the frequency bands indicated in the frequencyBandList for supplementary uplink, if configured~~, and they are not downlink only bands, and 2> if the UE supports at least one *additionalSpectrumEmission* in the *NR-NS-PmaxList* for a supported band in the downlink and a supported band in uplink for FDD~~within the frequencyBandList of FrequencyInfoUL-SIB for FDD or of FrequencyInfoDL-SIB for TDD for the frequency band selected by the UE (for the downlink and uplink or supplementary uplink, if configured)~~, and 2> if the UE supports the bandwidth of the initial uplink BWP and of the initial downlink BWPs indicated in the *locationAndBandwidth* fields:

3> <u>select the first frequency band in the *frequencyBandList* which the UE supports and for which the UE supports at least one of the *additionalSpectrumEmission* values in *nr-NS-PmaxList*, if present;</u>

3> forward the *cellIdentity* to upper layers;

3> forward the *trackingAreaCode* to upper layers;

3> if in RRC_INACTIVE and the forwarded *trackingAreaCode* does not trigger message transmission by upper layers:

4> if the serving cell does not belong to the configured *ran-NotificationAreaInfo*:

5> initiate an RNA update as specified in 5.3.13.8;

3> forward the *ims-EmergencySupport* to upper layers, if present;

3> forward the *eCallOverIMS-Support* to upper layers, if present;

3> apply the configuration included in the *servingCellConfigCommon*;

3> apply the specified PCCH configuration defined in 9.1.1.3;

3> if the UE has a stored valid version of a SIB, in accordance with sub-clause 5.2.2.2.1, that the UE requires to operate within the cell in accordance with sub-clause 5.2.2.1:

4> use the stored version of the required SIB;

3> if the UE has not stored a valid version of a SIB, in accordance with sub-clause 5.2.2.2.1, of one or several required SIB(s), in accordance with sub-clause 5.2.2.1:

FIG.8B

> 4> for the SI message(s) that, according to the *si-SchedulingInfo*, contain at least one required SIB and for which *si-BroadcastStatus* is set to *broadcasting*:
>> 5> acquire the SI message(s) as defined in sub-clause 5.2.2.3.2;
> 4> for the SI message(s) that, according to the *si-SchedulingInfo*, contain at least one required SIB and for which *si-BroadcastStatus* is set to *notBroadcasting*:
>> 5> trigger a request to acquire the SI message(s) as defined in sub-clause 5.2.2.3.3;
> 3> apply the first listed *additionalSpectrumEmission* which it supports among the values included in *NR-NS-PmaxList* within *frequencyBandList*;
> 3> if the *additionalPmax* is present in the same entry of the selected *additionalSpectrumEmission* within *NR-NS-PmaxList*:
>> 4> apply the *additionalPmax*;
> 3> else:
>> 4> apply the *p-Max*;
> 3> if *supplementaryUplink* is present in *servingCellConfigCommon*, and
> 3> if the UE supports one or more of the frequency bands indicated in the *frequencyBandList* for supplementary uplink, and
> 3> if the UE supports at least one *additionalSpectrumEmission* in the *NR-NS-PmaxList* for a supported supplementary uplink band, and
> 3> if the UE supports the bandwidth of the initial uplink BWP indicated in the *locationAndBandwidth* field of supplementary uplink:
>> 4> consider *supplementaryUplink* as configured for the cell;
>> 4> apply the first listed *additionalSpectrumEmission* which it supports among the values included in *NR-NS-PmaxList* within *frequencyBandList* for the *supplementaryUplink*;
>> 4> if the *additionalPmax* is present in the same entry of the selected *additionalSpectrumEmission* within *NR-NS-PmaxList* for the *supplementaryUplink*:
>>> 5> apply the *additionalPmax*;
>> 4> else:
>>> 5> apply the *p-Max*;
> 2> else:
>> 3> consider the cell as barred in accordance with TS 38.304 [20]; and
>> 3> perform barring as if *intraFreqReselection* is set to *notAllowed*;

USER APPARATUS AND BASE STATION APPARATUS

FIELD OF THE INVENTION

The present invention relates to a user apparatus and a base station apparatus in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1).

In NR, random access is performed for synchronization establishment between a user apparatus and a base station apparatus, and for Scheduling Request, as in LTE. There are two types of random access procedures, a contention based random access procedure (CBRA) and a contention free random access (CFRA) (for example, Non-Patent Document 2).

CITATION LIST

Non-Patent Document

[Non-Patent Document 1] 3GPP TS 38.300 V15.4.0 (2018-12)
[Non-Patent Document 2] 3GPP TS 38.321 V15.4.0 (2018-12)

SUMMARY OF THE INVENTION

Technical Problem

In an NR wireless communication system, there is a case in which NUL (Normal Uplink) or SUL (Supplementary Uplink) is selected when a random access procedure is performed by a user apparatus. However, in a case where a user apparatus does not support SUL while a serving cell supports SUL, the user apparatus tends to perform a redundant determination operation with respect to using SUL.

The present invention has been made in view of the above points, and an object is to perform an efficient random access procedure.

Solution to Problem

According to the disclosed technique, provided is a user apparatus including: a transmission unit configured to transmit a signal related to a random access procedure in a serving cell; a reception unit configured to receive a signal related to the random access procedure in the serving cell; and a control unit configured to determine a carrier to be used for the random access procedure, the carrier being configured to the serving cell, wherein: the control unit determines whether a first carrier is configured to the serving cell; the control unit determines whether the first carrier of the serving cell is supported in a case where the first carrier is configured to the serving cell; the control unit determines to use the first carrier for the random access procedure in a case where the first carrier of the serving cell is supported; and an operation of determining the carrier to be used for the random access procedure is performed in at least one of a MAC (Media Access Control) layer and an RRC (Radio Resource Control) layer.

Advantageous Effects of Invention

According to an embodiment of the present invention, an efficient random access procedure can be performed.

BRIEF DESCRIPTION OF THE DRAWINGS

FIG. 5 is a sequence diagram illustrating an operation example of carrier selection of the random access procedure performed in a MAC (Media Access Control) layer.
FIG. 6 is a sequence diagram illustrating an operation example of carrier selection of the random access procedure performed in an RRC (Radio Resource Control) layer.
FIG. 7A is a diagram illustrating an example of an operation specification of carrier selection of the random access procedure performed in a MAC (Media Access Control) layer.
FIG. 7B is a diagram illustrating an example of an operation specification of carrier selection of the random access procedure performed in a MAC (Media Access Control) layer.
FIG. 8A is a diagram illustrating an example of an operation specification of carrier selection of the random access procedure performed in an RRC (Radio Resource Control) layer.
FIG. 8B is a diagram illustrating an example of an operation specification of carrier selection of the random access procedure performed in an RRC (Radio Resource Control) layer.

DETAILED DESCRIPTION OF THE PREFERRED EMBODIMENTS

Figure 1:
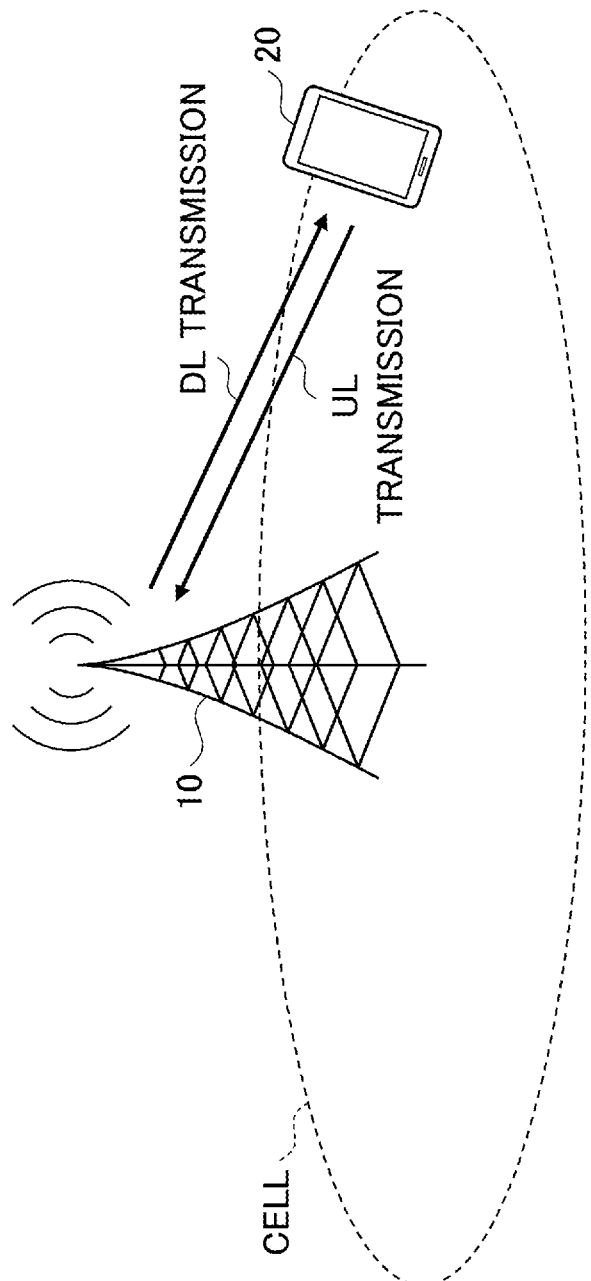
FIG. 1 is a drawing illustrating a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme newer than LTE-Advanced (e.g., NR).

Further, in one or more embodiments described below, terms that are used in the existing LTE are used here, such as SS (Synchronization Signal), PSS (Primary SS), SSS (Secondary SS), PBCH (Physical broadcast channel), PRACH (Physical random access channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

Furthermore, in an embodiment of the present invention, the duplex method may be TDD (Time Division Duplex), FDD (Frequency Division Duplex), or other methods (e.g., Flexible Duplex, or the like).

Further, in an embodiment of the present invention, the expression, a radio parameter, and the like, are "configured" may mean that a predetermined value is pre-configured, or may mean that a radio parameter indicated by the base station apparatus 10 or the user apparatus 20 is configured.

FIG. 1 is a drawing illustrating a wireless communication system according to an embodiment of the present invention. As illustrated in FIG. 1, the wireless communication system includes a base station apparatus 10 and a user apparatus 20. In FIG. 1, a single base station apparatus 10 and a single user apparatus 20 are illustrated as examples. There may be a plurality of the base station apparatuses 100 and a plurality of the user apparatuses 200.

The base station apparatus 10 is a communication apparatus that provides one or more cells and performs wireless communications with the user apparatus 20. Physical resources of the radio signal may be defined in the time domain and the frequency domain, the time domain may be defined by the number of OFDM symbols, and the frequency domain may be defined by the number of sub-carriers or resource blocks. The base station apparatus 10 transmits a synchronization signal and system information to the user apparatus 20. The synchronization signal is, for example, an NR-PSS and an NR-SSS. The system information is transmitted via, for example, a NR-PBCH, and may be referred to as broadcast information. As shown in FIG. 1, the base station apparatus 10 transmits a control signal or data in DL (Downlink) to the user apparatus 20 and receives a control signal or data in UL (Uplink) from the user apparatus 20. The base station apparatus 10 and the user apparatus 20 are capable of transmitting and receiving a signal by performing the beamforming. Further, both the base station apparatus 10 and the user apparatus 20 can apply MIMO (Multiple Input Multiple Output) communication to the DL or UL. Further, both the base station apparatus 10 and the user apparatus 20 may perform communications via an SCell (Secondary Cell) and a PCell (Primary Cell) using CA (Carrier Aggregation).

The user apparatus 20 may be a communication apparatus that includes a wireless communication function such as a smart-phone, a mobile phone, a tablet, a wearable terminal, or a communication module for M2M (Machine-to-Machine). As shown in FIG. 1, the user apparatus 20 uses various communication services provided by the wireless communication system by receiving control signals or data in DL from the base station apparatus 10 and transmitting control signals or data in UL to the base station apparatus 10.

In a random access procedure performed for synchronization establishment between a user apparatus 20 and a base station apparatus 10, and for Scheduling Request, for example, the user apparatus 20 transmits, as a UL signal, a random access preamble or a UE (User equipment) identifier to the base station apparatus 10, and the base station apparatus 10 transmits, as a DL signal, a random access response and information used for contention resolution to the user apparatus 20.

Figure 2:
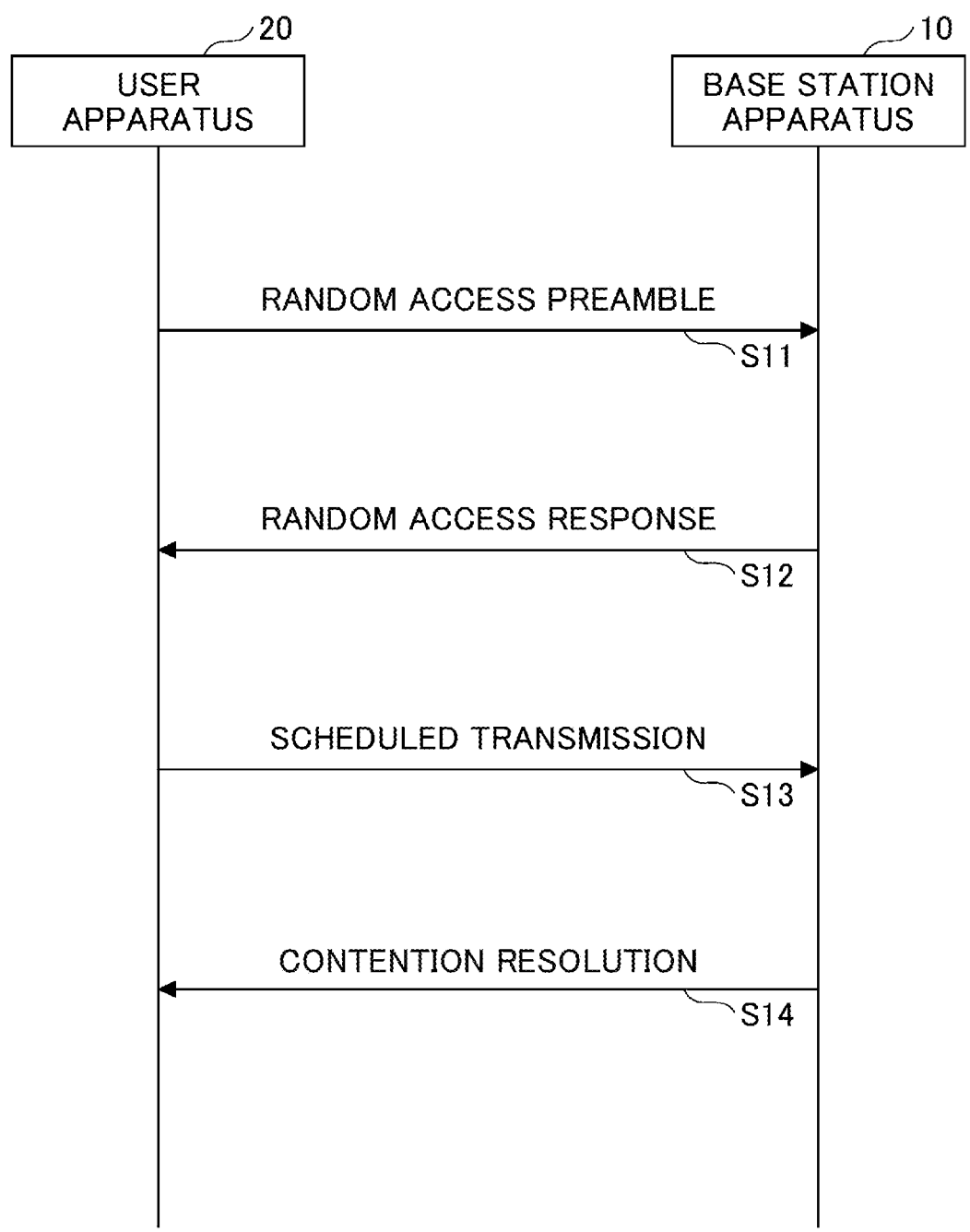
FIG. 2 is a sequence diagram illustrating an example (1) of a random access procedure.

FIG. 2 is a sequence diagram illustrating an example (1) of a random access procedure. An example of a random access procedure illustrated in FIG. 2 is a contention based random access procedure. When the contention based random access procedure is started, the user apparatus 20 transmits a random access preamble to the base station apparatus 10 in step S11. Subsequently, the base station apparatus 10 transmits a random access response to the user apparatus 20 (S12). Subsequently, the user apparatus 20 performs transmission to the base station apparatus 10, the transmission being scheduled by the random access response (S13). In the scheduled transmission, information for identifying the user apparatus 20 is transmitted. Subsequently, the base station apparatus 10 transmits information for contention resolution to the user apparatus 20 (S14). When the contention resolution is successful, the random access procedure is successful and is completed.

Figure 3:
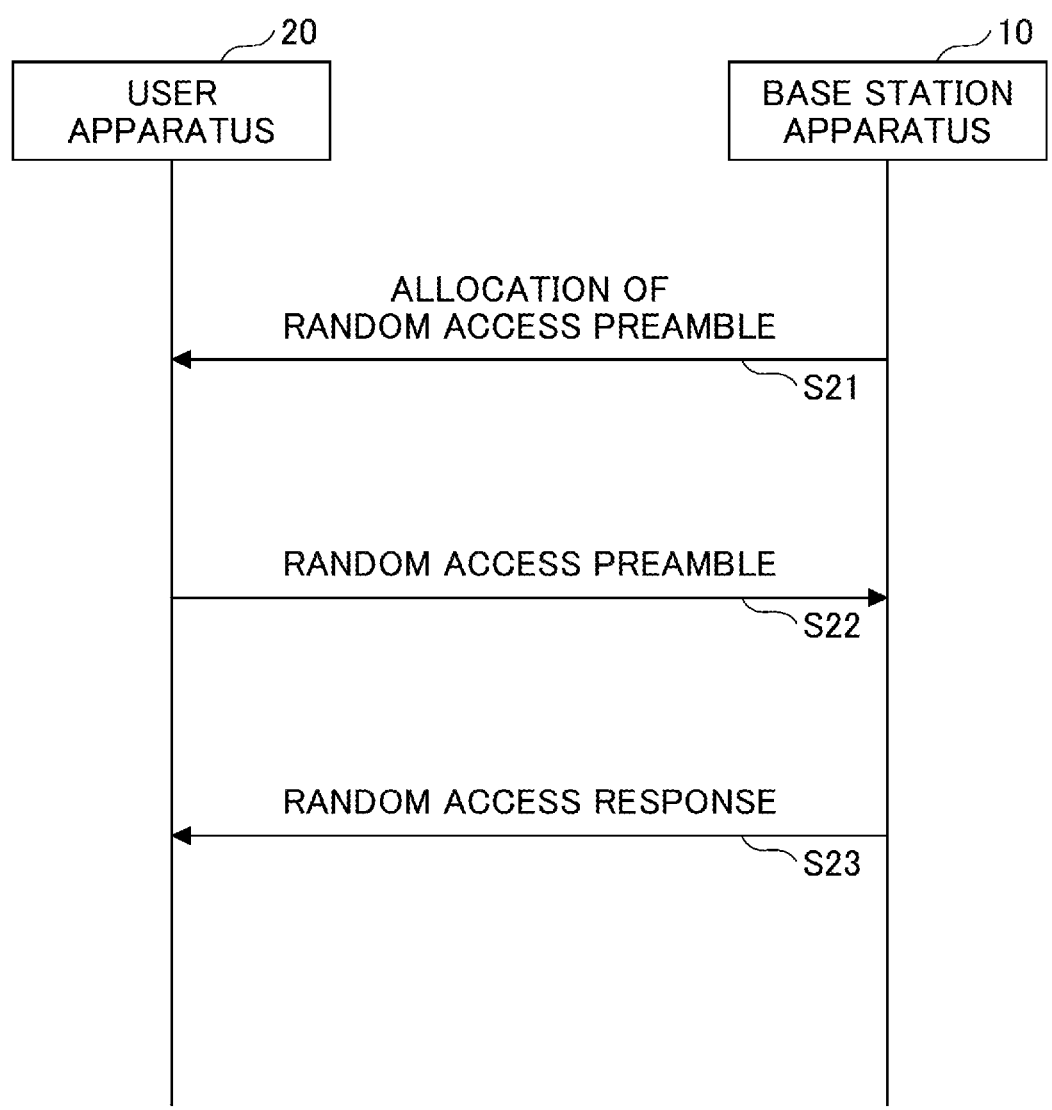
FIG. 3 is a sequence diagram illustrating an example (2) of a random access procedure.

FIG. 3 is a sequence diagram illustrating an example (2) of a random access procedure. An example of a random access procedure illustrated in FIG. 3 is a contention free random access procedure. When the contention free random access procedure is started, the base station apparatus 10 allocates a random access preamble to the user apparatus 20 in step S21. Subsequently, the user apparatus 20 transmits the allocated random access preamble to the base station apparatus 10 (S22). Subsequently, the base station apparatus 10 transmits a random access response to the user apparatus 20.

Figure 4:
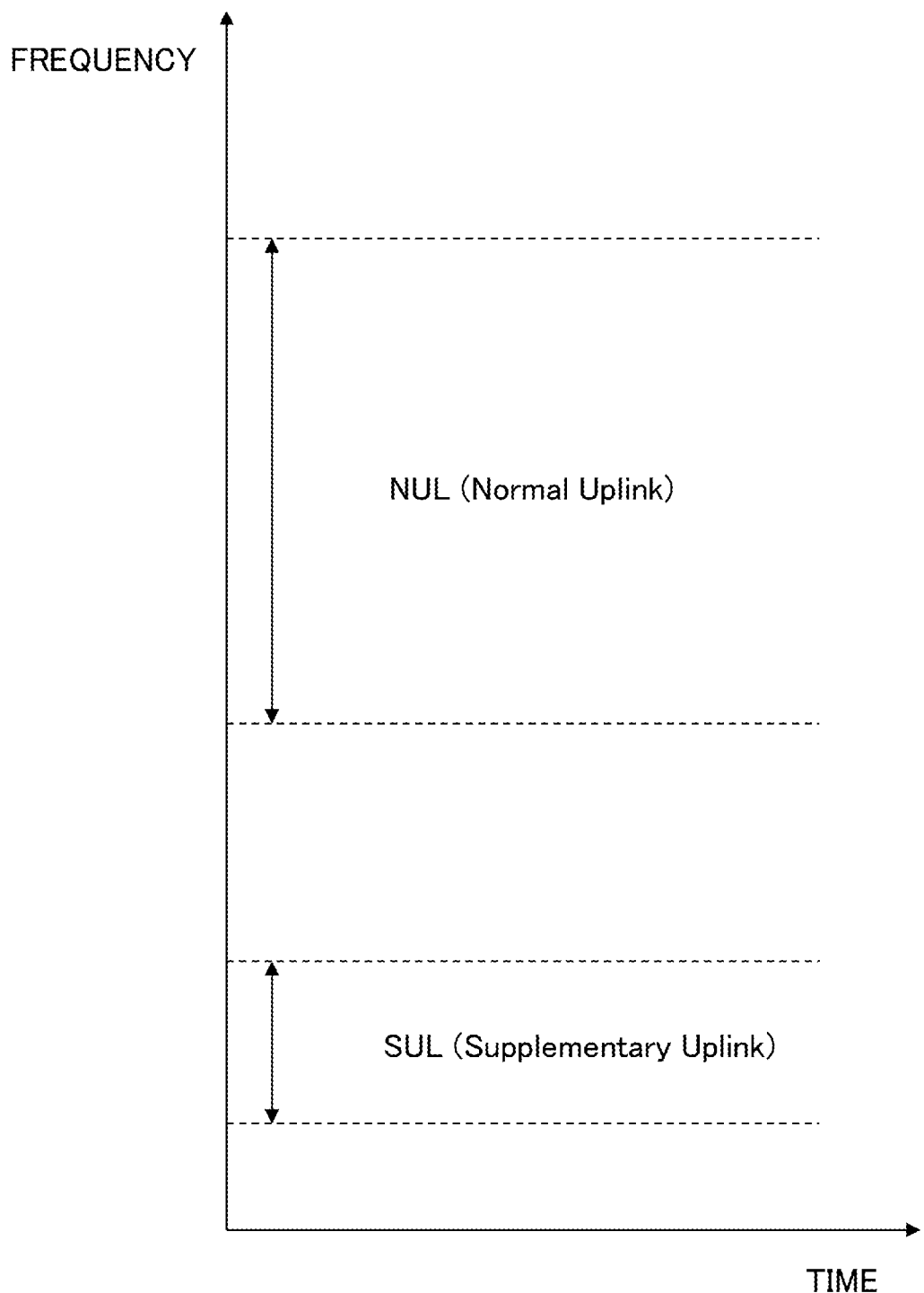
FIG. 4 is a drawing illustrating examples of NUL and SUL.

FIG. 4 is a drawing illustrating examples of NUL and SUL. As illustrated in FIG. 4, a NUL (Normal Uplink) carrier and an SUL (Supplementary Uplink) carrier are configured to be separated in the frequency domain. In general, the SUL carrier is configured in a frequency band lower than the NUL carrier. The user apparatus 20 performs a random access procedure using the NUL carrier or the SUL carrier.

FIG. 5 and FIG. 6 are flowcharts illustrating examples of an operation of carrier selection of the random access procedure in an embodiment of the present invention. Referring to FIG. 5 and FIG. 6, an operation of carrier selection, which is a part of the random access procedure in the user apparatus 20, will be described. The operation may be an operation mainly performed in the MAC (Media Access Control) layer as illustrated in FIG. 5, or may be an operation mainly performed in the RRC (Radio Resource Control) layer as illustrated in FIG. 6. Further, the operation may be a combination of operations in both layers.

(Example in which Operation is Performed in Mac Layer)

An example, in which an operation of carrier selection as a part of the random access procedure is performed in a MAC (Media Access Control) layer, will be described using FIG. 5.

In step S31, the user apparatus 20 starts a random access procedure in a serving cell. Subsequently, the user apparatus 20 flushes a message 3 buffer, sets a preamble transmission counter to 1, sets a preamble power ramping counter to 1, and sets a preamble backoff to 0 ms (S32).

In step S33, the user apparatus 20 determines whether a carrier to be used for random access is explicitly signaled. The procedure proceeds to step S34 in a case where the carrier to be used for random access is explicitly signaled (YES in S33), and the procedure proceeds to step S35 in a case where the carrier to be used for random access is not explicitly signaled (NO in S33).

In step S34, the user apparatus 20 uses the signaled carrier for the random access procedure, and configures a maximum power. On the other hand, in step S35, the user apparatus 20 determines whether SUL is configured to the serving cell. The procedure proceeds to step S36 in a case where SUL is configured to the serving cell (YES in S35), and the procedure proceeds to step S39 in a case where SUL is not configured to the serving cell (NO in S35).

In step S36, the user apparatus 20 determines whether SUL of the serving cell is supported. The procedure proceeds to step S37 in a case where SUL of the serving cell is supported (YES in S36), the process proceeds to step S39 in a case where SUL of the serving cell is not supported (NO in S36). Here, the determination in step S36 may be a determination whether the user apparatus 20 supports a band combination including an SUL band that is applied to the serving cell.

In step S37, the user apparatus 20 determines whether RSRP (Reference Signal Received Power) of a DL (Downlink) pathloss reference is less than a predetermined threshold value. The procedure proceeds to step S38 in a case where the RSRP of the DL pathloss reference is less than the predetermined threshold value (YES in S37), and the procedure proceeds to step S39 in a case where the RSRP of the DL pathloss reference is not less than the predetermined threshold value (NO in S37).

In step S38, the user apparatus 20 uses the SUL carrier for the random access procedure, and configures the maximum power. On the other hand, in step S39, the user apparatus 20 uses the NUL carrier for the random access procedure, and configures a maximum power.

(Example in which Operation is Performed in RRC Layer)

Next, an example, in which an operation of carrier selection as a part of the random access procedure is performed in an RRC (Radio Resource Control) layer, will be described using FIG. 6.

In step S41, the user apparatus 20 determines whether there is SUL information in the configuration information of the serving cell. The procedure proceeds to step S42 in a case where the SUL information exists (YES in S41), and the selection operation ends in a case where the SUL information does not exist (NO in S41).

In step S42, the user apparatus 20 determines whether one or more frequency bands indicated by a frequency band list for SUL are supported. The procedure proceeds to step S43 in a case where the one or more frequency bands are supported (YES in S42), and, the selection operation ends in a case where the one or more frequency bands are not supported (NO in S42).

In step S43, the user apparatus 20 determines whether at least one spectrum emission, in a maximum power list for supported frequency bands, is supported. The procedure proceeds to step S44 in a case where the at least one spectrum emission is supported (YES in S43), and the selection operation ends in a case where the at least one spectrum emission is not supported (NO in S43).

In step S44, the user apparatus 20 determines whether a bandwidth of an initial uplink BWP (Bandwidth Part) is supported. The procedure proceeds to step S45 in a case where the bandwidth of the initial uplink BWP is supported (YES in S44), and the selection operation ends in a case where the bandwidth of the initial uplink BWP is not supported (NO in S44).

In step S45, the user apparatus 20 determines that SUL is configured to the serving cell, and, in step S46, applies predetermined spectrum emission, and applies predetermined maximum power.

For example, the determination that SUL is configured to the serving cell in step S45 will be followed by an operation for a case in which SUL is configured to the serving cell, in an existing random access procedure of a MAC layer.

According to the above described embodiment of the present invention, the user apparatus 20 can efficiently select a carrier to be used in a random access procedure in which an SUL carrier or an NUL carrier is used.

In other words, an efficient random access procedure can be performed.

(Specification Example of an Operation of Carrier Selection)

FIG. 7A and FIG. 7B are drawings illustrating a specification example of an operation of carrier selection for the random access procedure performed in a MAC (Media Access Control) layer, and correspond to a sequence diagram of FIG. 5 illustrating an operation example of carrier selection for the random access procedure performed in the MAC (Media Access Control) layer.

For example, the specifications of "if the RSRP of the downlink pathloss reference is less than rsrp-ThresholdSSB-SUL" in FIG. 7A corresponds to an operation of a user apparatus 20 of determining whether RSRP (Reference Signal Received Power) of a DL (Downlink) pathloss reference is less than a predetermined threshold value in step S37 of FIG. 5.

FIG. 8A and FIG. 8B are drawings illustrating a specification example of an operation of carrier selection for the random access procedure performed in an RRC (Radio Resource Control) layer, and correspond to a sequence diagram of FIG. 6 illustrating an operation example of carrier selection for the random access procedure performed in the RRC (Radio Resource Control) layer. In FIG. 8A, a procedure is shown which is performed after broadcast information (SIB1) is received by the user apparatus 20.

For example, the specification of "if supplementaryUplink is present in servingCellConfigCommon" in FIG. 8B corresponds to an operation of the user apparatus 20 of determining whether SUL information is present in the configuration information of the serving cell in step S41 of FIG. 6.

(Apparatus Configuration)

Next, examples of functional structures of the base station apparatus 10 and the user apparatus 20 that perform the processes and operations described above will be described. The base station apparatus 10 and the user apparatus 20 each have functions for performing an embodiment of the present invention. It should be noted that the base station apparatus 10 and the user apparatus 20 each may have only a part of the functions for performing an embodiment of the present invention.

<Base Station Apparatus 10>

Figure 9:
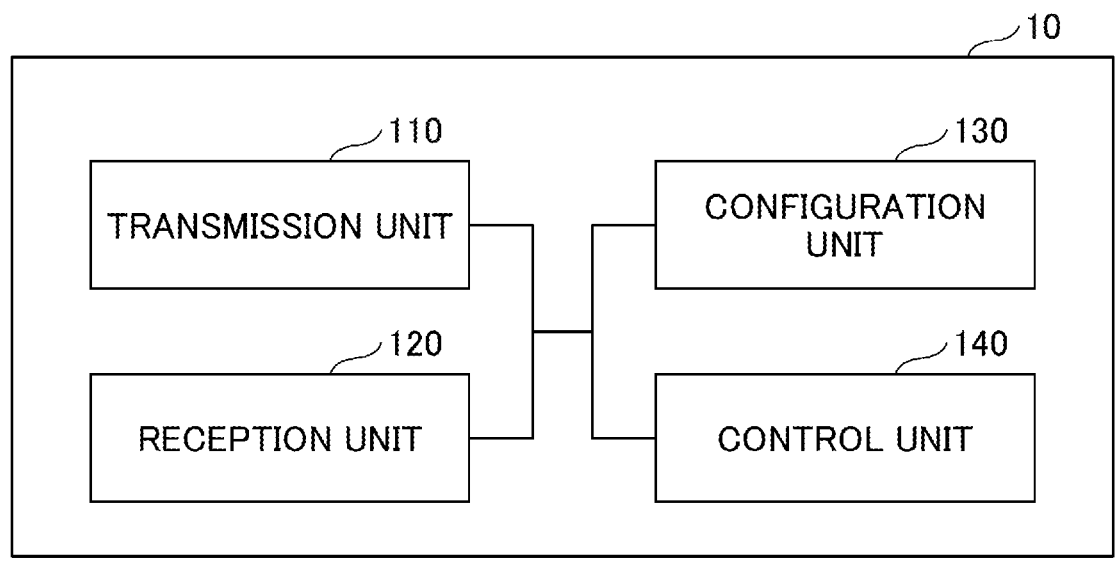
FIG. 9 is drawing illustrating an example of a functional structure of a base station apparatus 10 according to an embodiment of the present invention.

FIG. 9 is a drawing illustrating an example of a functional structure of a base station apparatus 10. As illustrated in FIG. 9, the base station apparatus 10 includes a transmission unit 110, a reception unit 120, a configuration unit 130, and a control unit 140. The functional structure illustrated in FIG. 9 is merely an example. Functional divisions and names of functional units may be anything as long as it can perform operations according to an embodiment of the present invention.

The transmission unit 110 has a function for generating a signal to be transmitted to the user apparatus 20 and for transmitting the signal wirelessly. The reception unit 120 has a function for receiving various signals transmitted from the user apparatus 20 and for obtaining, for example, upper layer information from the received signals. Further, the transmission unit 110 has a function for transmitting to the user apparatus 20 NR-PSS, NR-SSS, NR-PBCH, DL/UL control signals, DL/UL data signals, etc.

The configuration unit 130 stores, in the storage device, preset configuration information and various configuration information items to be transmitted to the user apparatus 20, and reads them from the storage device if necessary. Contents of the configuration information are, for example, configurations related to random access, or the like.

The control unit 140 performs random access procedure with the user apparatus 20 as described in an embodiment of the present invention. The functional units related to signal transmission in the control unit 140 may be included in the transmission unit 110, and the functional units related to signal reception in the control unit 140 may be included in the reception unit 120.

<User Apparatus 20>

Figure 10:
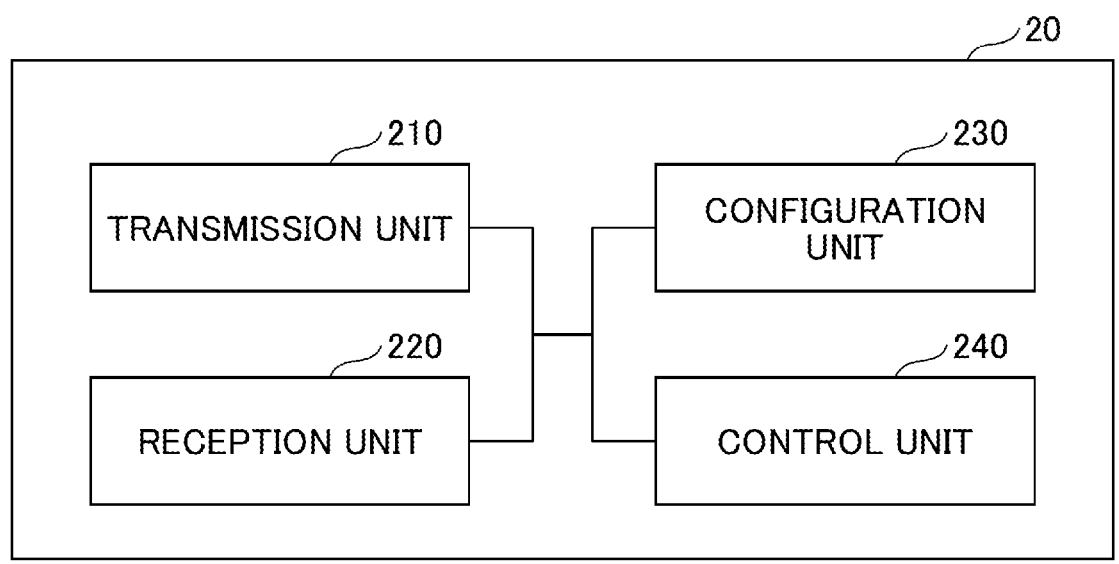
FIG. 10 is drawing illustrating an example of a functional structure of a user apparatus 20 according to an embodiment of the present invention.

FIG. 10 is a drawing illustrating an example of a functional structure of a user apparatus 20. As illustrated in FIG. 10, the user apparatus 20 includes a transmission unit 210, a reception unit 220, a configuration unit 230, and a control unit 240. The functional structure illustrated in FIG. 7 is merely an example. Functional divisions and names of functional units may be anything as long as it can perform operations according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station apparatus 10. Further, for example, with respect to the D2D communications, the transmission unit 210 transmits, to another user apparatus 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the another user apparatus 20, PSCCH, PSSCH, PSDCH, or PSBCH.

The configuration unit 230 stores, in the storage apparatus, various configuration information items received from the base station apparatus 10 or the user apparatus 20 via the reception unit 220, and reads them from the storage device if necessary. Further, the configuration unit 230 also stores preset configuration information. Contents of the configuration information are, for example, configurations related to random access, or the like.

The control unit 240 performs random access procedure with the base station apparatus 10 as described in an embodiment of the present invention. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 9 and FIG. 10), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming, broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 11:
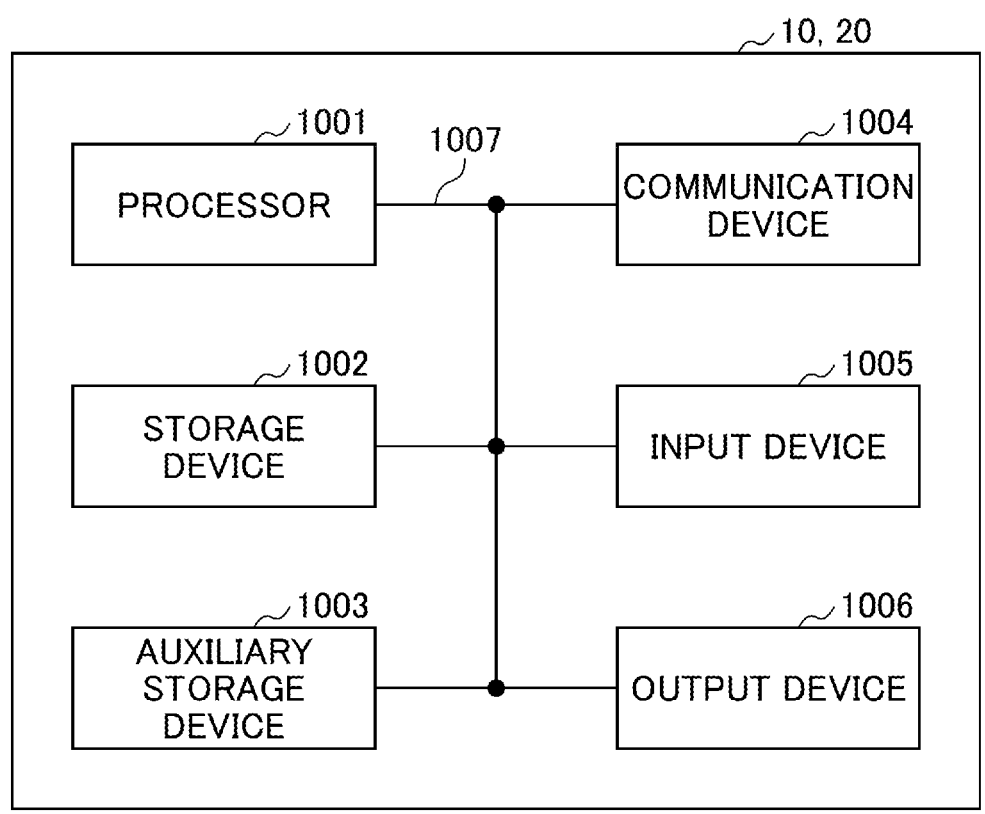
FIG. 11 is a drawing illustrating an example of a hardware structure of the base station apparatus 10 or the user apparatus 20 according to an embodiment of the present invention.

For example, the base station apparatus 10, the user apparatus 20, or the like according to an embodiment of the present invention may function as a computer for processing the radio communication method illustrated by an embodiment of the present invention. FIG. 11 is a drawing illustrating an example of hardware structures of a base station apparatus 10 and a user apparatus 20 according to an embodiment of the present invention. Each of the base station apparatus 10 and the user apparatus 20 may be physically a computer apparatus including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station apparatus 10 and the user apparatus 20 may include one or more of each of the apparatuses illustrated in the figure, or may not include some apparatuses.

Each function in the base station apparatus 10 and the user apparatus 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads a program (program code), a software module, or data from the auxiliary storage device 1003 and/or the communication device 1004 to the storage apparatus 1002, and performs various processes according to the program, the software module, or the data. As the program, a program is used that causes the computer to perform at least a part of operations according to an embodiment of the present invention described above. For example, the control unit 140 of the base station apparatus 10 illustrated in FIG. 9 may be realized by control programs that are stored in the storage device 1002 and are executed by the processor 1001. Further, for example, the control unit 240 of the user apparatus 20 illustrated in FIG. 10 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station apparatus 10 and the user apparatus 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, provided is a user apparatus including: a transmission unit configured to transmit a signal related to a random access procedure in a serving cell; a reception unit configured to receive a signal related to the random access procedure in the serving cell; and a control unit configured to determine a carrier to be used for the random access procedure, the carrier being configured to the serving cell. The control unit determines whether a first carrier is configured to the serving cell, the control unit determines whether the first carrier of the serving cell is supported in a case where the first carrier is configured to the serving cell, the control unit determines to use the first carrier for the random access procedure in a case where the first carrier of the serving cell is supported, and an operation of determining the carrier to be used for the random access procedure is performed in at least one of a MAC (Media Access Control) layer and an RRC (Radio Resource Control) layer.

According to the above configuration, the user apparatus 20 can efficiently select a carrier to be used in a random access procedure in which an SUL carrier or an NUL carrier is used. In other words, an efficient random access procedure can be performed.

The first carrier may be SUL (Supplementary Uplink). According to the above configuration, the user apparatus can efficiently select a carrier to be used in a random access procedure in which an SUL carrier or an NUL carrier is used.

The control unit may determine to use a second carrier for the random access procedure in a case where the first carrier is configured to the serving cell and the first carrier of the serving cell is not supported. According to the above configuration, the user apparatus can efficiently select a carrier to be used in a random access procedure in which an SUL carrier or an NUL carrier is used.

The second carrier may be NUL (Normal Uplink). According to the above configuration, the user apparatus can efficiently select a carrier to be used in a random access procedure in which an SUL carrier or an NUL carrier is used.

Further, according to an embodiment of the present invention, provided is a base station apparatus including: a reception unit configured to receive, from a user apparatus, a signal related to a random access procedure in a serving cell; a transmission unit configured to transmit a signal related to the random access procedure in the serving cell; and a control unit configured to determine a carrier to be used for the random access procedure, the carrier being configured to the serving cell. The control unit determines to use a first carrier for the random access procedure in a case where the first carrier is configured to the serving cell and the first carrier of the serving cell is supported by the user apparatus, and an operation of determining a carrier to be used for the random access procedure is performed in at least one of a MAC (Media Access Control) layer and an RRC (Radio Resource Control) layer.

According to the above configuration, the user apparatus 20 can efficiently select a carrier to be used in a random access procedure in which an SUL carrier or an NUL carrier is used. In other words, an efficient random access procedure can be performed.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a base station apparatus 10 and a user apparatus 20 have been described by using functional block diagrams. However, the apparatuses may be realized by hardware, software, or a combination of hardware and software. The software executed by a processor included in a base station apparatus 10 according to an embodiment of the present invention and the software executed by a processor included in a user apparatus 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication (transmission, notification) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 10 in the present specification, may be performed by an upper node in some cases. In a network including one or more network nodes including a base station apparatus 10, it is apparent that various operations performed for communicating with a user apparatus 20 may be performed by the base station apparatus 10 and/or another network node other than the base station apparatus 10 (for example, but not limited to, MME or S-GW). According to the above, a case is described in which there is a single network node other than the base station apparatus 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple user apparatuses 20 (e.g., may be referred to as D2D (Device-to-Device), V2X (Vehicle-to-Everything), etc.). In this case, the function of the base station apparatus 10 described above may be provided by the user apparatus 20. Further, the phrases "up" and "down" may also be replaced by the phrases corresponding to terminal-to-terminal communication (e.g., "side"). For example, an uplink channel, an downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming," "expecting," or "considering," etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each user apparatus 20 to allocate radio resources (such as frequency bandwidth, transmission power, etc. that can be used in each user apparatus 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in a RB may be the same, regardless of the numerology, and may be 12, for example. The number of subcarriers included in a RB may be determined on the basis of numerology.

Further, the time domain of a RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured to one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTI, the symbol length, the cyclic prefix (CP) length, and the like, may changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

It is noted that SUL is an example of the first carrier in the present disclosure. NUL is an example of the second carrier.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station apparatus
110 Transmission unit
120 Reception unit
130 Configuration unit
140 Control unit
20 User apparatus
210 Transmission unit
220 Reception unit
230 Configuration unit
240 Control unit
1001 Processor
1002 Storage apparatus
1003 Auxiliary storage apparatus
1004 Communication apparatus
1005 Input apparatus
1006 Output device

The invention claimed is:

1. A user apparatus comprising:
a processor configured to:
   determine to use an SUL (Supplementary Uplink) for a random access procedure in a case where the SUL is configured to a serving cell and where the SUL is supported, and
   determine whether at least one spectrum emission in a maximum power list for a supported frequency band is supported;
a transmitter configured to transmit a signal related to a random access procedure in a serving cell; and
a receiver configured to receive a signal for the signal related to the random access procedure in the serving cell,
wherein an operation of determining the carrier to be used for the random access procedure is performed in at least one of a MAC (Media Access Control) layer and an RRC (Radio Resource Control) layer.

2. The user apparatus according to claim 1, wherein the processor configures a maximum power of the SUL that is determined to be used for the random access procedure.

3. The user apparatus according to claim 1, wherein the processor determines whether the SUL is configured to the serving cell by determining whether information of the SUL is present in configuration information of the serving cell.

4. The user apparatus according to claim 1, wherein the processor determines whether the SUL of the serving cell is supported by determining whether one or more of frequency bands indicated by a frequency band list for the SUL are supported.

5. A base station apparatus comprising:
a processor configured to:
   determine to use an SUL (Supplementary Uplink) for a random access procedure in a case where the SUL is configured to a serving cell and where the SUL is supported by a user apparatus, and
   determine whether at least one spectrum emission in a maximum power list for a supported frequency band is supported;
a receiver configured to receive, from a user apparatus, a signal related to a random access procedure in a serving cell; and
a transmitter configured to transmit, to the user apparatus, a signal for the signal related to the random access procedure in the serving cell, the carrier being configured to the serving cell,
wherein an operation of determining a carrier to be used for the random access procedure is performed in at least one of a MAC (Media Access Control) layer and an RRC (Radio Resource Control) layer.

6. A communication method of a user apparatus, the communication method comprising:
determining to use an SUL (Supplementary Uplink) for a random access procedure in a case where the SUL is configured to a serving cell and where the SUL is supported;
determining whether at least one spectrum emission in a maximum power list for a supported frequency band is supported;
transmitting a signal related to a random access procedure in a serving cell; and
receiving a signal for the signal related to the random access procedure in the serving cell,
wherein an operation of determining a carrier used for the random access procedure is performed in at least one of a MAC (Media Access Control) layer and an RRC (Radio Resource Control) layer.

* * * * *